United States Patent [19]
Schmidt-Hellerau et al.

[11] 3,990,928
[45] Nov. 9, 1976

[54] METHOD OF COLD ADHESION OF WOOD GLUES TO WOOD PARTICLES

[75] Inventors: Christof Schmidt-Hellerau, Ludwigshafen; Otto Grabowsky, Limburgerhof, both of Germany

[73] Assignee: BASF Aktiengesellschaft, Ludwigshafen (Rhine), Germany

[22] Filed: Oct. 29, 1974

[21] Appl. No.: 518,629

[30] Foreign Application Priority Data
Nov. 2, 1973 Germany............................ 2354928

[52] U.S. Cl................................. 156/62.2; 156/331; 156/335; 260/17.3; 260/17.5; 260/29.4 R
[51] Int. Cl.²......................................... C08L 97/00
[58] Field of Search................. 156/335, 331, 62.2; 161/261, 262; 260/17.5, 29.3, 29.4 R, 124 R, 17.3, 17.2; 264/109; 428/326, 328, 537

[56] References Cited
UNITED STATES PATENTS

| | | | |
|---|---|---|---|
| 2,849,314 | 8/1958 | Goss .................................. | 260/17.5 |
| 3,025,250 | 3/1962 | Herrick et al...................... | 260/17.2 |
| 3,076,772 | 2/1963 | Christ ................................ | 260/17.2 |
| 3,296,159 | 1/1967 | Lissner.............................. | 260/17.2 |
| 3,597,375 | 8/1971 | Ludwig et al. ..................... | 260/17.5 |
| 3,697,355 | 10/1972 | Black................................. | 156/331 |
| 3,935,139 | 1/1976 | Ashall................................ | 260/17.5 |

*Primary Examiner*—William A. Powell
*Assistant Examiner*—Jerome W. Massie
*Attorney, Agent, or Firm*—Johnston, Keil, Thompson & Shurtleff

[57] ABSTRACT

Improvement of the cold adhesion of glue resins, particularly phenoplast and aminoplast wood glues, by the addition of small amounts of a ligninsulfonate.

4 Claims, No Drawings

METHOD OF COLD ADHESION OF WOOD GLUES TO WOOD PARTICLES

This application discloses and claims subject matter described in German Patent Application No. P 23 54 928.2, filed Nov. 2, 1973, which is incorporated herein by reference.

The most important binders for effecting wood bonding are the glues based on urea/formaldehyde, melamine/formaldehyde and phenol/formaldehyde condensates. Like the classical bone glues these formaldehyde condensates show only weak adhesion as long as they are not completely dry or cured. Irrespective of whether bonding is effected at low or high temperatures (this of course being dependent on the use of a suitable curing agent), the articles to be bonded must be held together until the glue has set. This is the main difference between such glues and so-called "adhesives" which hold the articles together fairly well even when still in the liquid state.

Such initial adhesion forces are particularly desirable when the glued articles must be moved whilst the glue is still unset (wet). In many industrial plants where wood materials are manufactured by precompression of the glued material and postcompression with heating (plywood, chipboard and door industries) the articles of wood material must be moved between these steps and must retain their shape as imparted in the precompression step.

It is an object of the invention to provide a method or means of improving the preliminary adhesion of wood glues. By wood glues we particularly mean the formaldehyde condensates of urea, melamine and phenols.

It is known to manufacture wood materials, particularly chipboard, by bonding wood chips or other particulate substances of vegetable origin by means of sulfite waste liquor as binder by compression with heating. By sulfite waste liquor we mean solutions of calcium ligninsulfonate such as are obtained in the manufacture of sulfite cellulose by digestion techniques (cf. Kirk-Othmer, Encyclopedia of Chemical Technology, 2nd Ed., entry "Lignin").

It is also known to manufacture chipboard in which some of the chips have been treated with sulfite waste liquor and the others with urea formaldehyde resins. This method is described in German Published Application No. 1,223,534. In a paper by E. Roffael published in "Holzzentralblatt" 1973, No. 57, there is the proposal to glue the center layer of chipboard with urea resins (UF resins) and the outer layers with 5% of phenol resin (PF resin) and 7% of sulfite waste liquor. The object of this latter method is to prevent liberation of free formaldehyde from the urea resin to the atmosphere in the manner described.

It is an object of the invention to provide a method of improving the low adhesion forces of aqueous urea/formaldehyde, melamine/formaldehyde and phenol/formaldehyde condensates in the wet, uncured state, when these are used as wood glues.

We have found that the addition of sulfite waste liquor in an amount of up to 10% (dry weight, based on the glue solution of the usual concentration of from 45 to 70%) to a wood glue considerably improves the cold adhesion of the glue. The addition of liquid sulfite waste liquor to the resin produces this effect just as well as the powders which are obtained from said waste liquors and which are commercially available, for example under the trade name "COLLEX POWDER CA/X" sold by Ligninchemie Waldhof GmbH. This substance is preferably used in the form of powder. It may be referred to, chemically, as sodium ligninsulfonate and is a by-product of the production of sulfite cellulose.

By urea resin glues we mean the urea/formaldehyde condensates which are usually condensed up to the point of commencement of water-incompatibility and which have a urea-to-formaldehyde molar ratio of from about 1:1.2 to 1:1.8, these being commonly used as wood glues. Other suitable glues for the purposes of the invention are melamine/formaldehyde condensates of suitable types (in which the molar ratio of melamine to formaldehyde is generally from 1:1.5 to 1:3.0) and phenol/formaldehyde condensates having a molar ratio of phenol to formaldehyde of from 1:1.5 to 1:2.3, these having been condensed under alkaline conditions. Also suitable are cocondensates and condensate mixtures of the above substances. The concentration of the resin in the usually aqueous solution is generally from about 40 to 75% by weight.

The improvement in the cold adhesion or initial bond strength of wood glues by the method of the invention by the addition of sulfite waste liquor is achieved by the use of amounts thereof as low as, say, from 1 to 3%. If a greater increase in the initial bond strength is desired, as governed by the purpose to which the glues are to be put, the said addition may be raised to 5 or even 10% without detriment to the strength of the bond, the pressing time and other factors. In general, there is no further advantage in increasing the addition beyond 5%, at least not for improvement of the initial bond strength, since no further increase in said bond strength is observed above this level. Thus the invention differs fundamentally from the proposals occasionally made in the literature concerning the general use of sulfite waste liquors in admixture with, say, urea resins. These proposals have not been adopted industrially, since they involve compatibility problems in the glue resin and also the problem of an unduly prolonged curing time.

Two methods of testing the cold adhesion are used, and these are described below in place of an Example and at the same time illustrate the improvement achieved by the invention.

1. Bonding of strips of beechwood 60 beechwood strips measuring 125 × 20 × 5 mm are taken and a specific amount of undiluted glue (1.0 g) is applied to the end of each of these strips over an area measuring 20 × 20 mm. The strips are paired off and the glued ends of the strips in each pair are pressed together such that the unglued ends point in a straight line away from each other. The overlapping portions of each pair of strips are then subjected to a specific pressure of 2.5 N/cm$^2$ for a period of 2 hours, under ambient conditions corresponding to normal climatic conditions (20° C, 65% relative humidity). As no curing agent is present, the glued joint merely dries without curing. The strips are then pulled apart in a testing machine. The average strength thus determined is a sure guide to the cold bond strength or cold adhesion. For orientation purposes, a small number of individual tests is sufficient to give valuable results.

The following bond strengths were found using a commercial UF wood glue (KAURIT glue 385 fl by BASF AG):

| | |
|---|---|
| glue containing no additive | 3.24 N/cm² |
| glue containing 1% of pulverized sulfite waste liquor (COLLEX CA/X by Lignin-Chemie Waldhof GmbH) | 6.91 N/cm² |
| glue containing 2% of said pulverized sulfite waste liquor | 9.05 N/cm² |

2. Self-detachment test on precompressed chipboard cakes

Conventional binder mixture consisting of glue, curing agent, paraffin dispersions and water is sprayed onto chips which are then treated in a strewing machine to form a cake measuring 600 × 460 mm. This is then subjected to a pressure of 25 N/cm² for 10 sec. in a cold press. This precompressed chip cake is placed on a table-top with a length of 30 cm thereof projecting horizontally beyond the edge of the table. The time taken for this freely projecting portion to detach itself from the remainder of the cake indicates the bonding properties of the binder.

Using this method we found the following results:

| | sec. |
|---|---|
| glue mixture (as in Test 1) containing no additive | 35 |
| glue mixture containing 1% of pulverized sulfite waste liquor (as in Test 1) | 193 |
| glue mixture containing 2% of said sulfite waste | 350 |
| glue mixture containing 4% of said sulfite waste | >600 |

In another test, a glue resin which is specifically recommended for achieving good cold bond strengths is used (KAURIT glue 320 fl). 5 boards [+] are made with the glue alone and 5 other boards were made with the glue together with 4% of sulfite waste liquor in pulverized form, all of the boards being compressed in the usual manner. Precompressed chip cakes were made with the same materials and then subjected to the self-detachment test described above. The conditions of manufacture and the results are listed in Tables 1 and 2 below. In addition to the considerable increase in the cold adhesion there is also a statistically demonstrable improvement in the transverse tensile strength by 15%.

[+]single-ply boards made of test chips of pine and having a thickness of 18 mm, compressed cold for 10 seconds and then at 170° C for 270 seconds without the use of a metal sheet.

TABLE 1

| (all quantities by weight) | Glue mixture A (parts) | Glue mixture B (parts) |
|---|---|---|
| glue | 100.0 | 100.0 |
| paraffin emulsion (50%) | 5.0 | 5.0 |
| ammonium chloride solution (20%) | 5.0 | 5.0 |
| ammonia (25%) | 1.7 | 1.7 |
| water | 15.3 | 12.3 |
| ligninsulfonate powder (predissolved in water in the ratio 1:1) | — | 8.0 |
| solid resin in binder (%) | 52.0 | 50.0 |
| solids content of binder (%) | 54.0 | 55.0 |
| viscosity at 20° C (centipoise) | 235 | 207 |
| gelling time at 100° C (sec.) | 83 | 94 |
| solid resin, based on dry chips (%) | 7.0 | 7.0 |

TABLE 2

| | Glue mixture A (averages of 30 tests) | | | | | | Glue mixture B (averages of 30 tests) | | | | | |
|---|---|---|---|---|---|---|---|---|---|---|---|---|
| moisture content of cake (%) | 7.8 | 7.8 | 9.1 | 8.3 | 7.8 | 8.2 | 8.4 | 8.2 | 7.9 | 7.8 | 8.3 | 8.1 |
| self-detachment time (sec) | 59 | 46 | 83 | 78 | 88 | 71 | | | | | | |
| thickness after sanding (mm) | 17.3 | 17.3 | 17.3 | 17.3 | 17.3 | 17.3 | 17.3 | 17.3 | 17.3 | 17.3 | 17.3 | 17.3 |
| density (kg/m³) | 677 | 662 | 674 | 674 | 669 | 671 | 670 | 682 | 678 | 672 | 661 | 673 |
| flexural strength (kg/cm²)V20 | 290 | 298 | 302 | 316 | 294 | 300 | 322 | 298 | 316 | 322 | 320 | 316 |
| transverse tensile strength minimum (kg/cm²) | 5.5 | 4.5 | 6.5 | 5.6 | 5.1 | | 7.5 | 8.0 | 6.8 | 7.1 | 7.3 | |
| | 7.0 | 6.9 | 7.9 | 7.5 | 7.0 | 7.3 | 8.7 | 9.1 | 8.0 | 8.4 | 8.0 | 8.4 |
| maximum | 8.2 | 8.2 | 8.8 | 9.0 | 7.9 | | 9.8 | 10.3 | 9.3 | 9.5 | 9.3 | |
| swell after 2 hrs. (%) | 7.3 | 7.9 | 5.6 | 5.7 | 7.6 | 6.8 | 6.2 | 6.6 | 6.3 | 7.3 | 7.8 | 6.8 |
| swell after 24 hrs. (%) | 18.4 | 19.0 | 15.3 | 16.2 | 18.2 | 17.4 | 16.5 | 17.3 | 17.4 | 17.9 | 17.7 | 17.4 |
| perforator value CH₂O (%) | 0.09 | 0.11 | 0.11 | 0.10 | 0.12 | 0.106 | 0.10 | 0.09 | 0.10 | 0.09 | 0.09 | 0.094 |

We claim:

1. In a process for the manufacture of glued wood parts or wood materials by wetting the wood parts or particles to be glued with a binder dissolved or dispersed in water followed by compression until the binder has hardened, the improvement which comprises wetting the wood parts on particles to be glued with a binder wherein said binder is prepared by mixing an aqueous solution of a urea-formaldehyde condensate having a urea-to-formaldehyde molar ratio of from about 1:1.2 to 1:1.8 with an amount of sodium ligninsulfonate in the range from an effective amount for improvement of the cold adhesion of said binder up to 5% by weight based on the weight of the condensate.

2. A process as set forth in claim wherein said aqueous solution of urea-formaldehyde condensate has a concentration of from 45 to 70%.

3. A process as set forth in claim 1 wherein said ureaformaldehyde condensate is condensed up to the point of commencement of water-incompatibility.

4. A process as set forth in claim 1 wherein the weight of sodium ligninsulfonate is from 1 to 3% by weight based on the weight of the condensate.

* * * * *